United States Patent
Beder et al.

(10) Patent No.: US 11,474,281 B2
(45) Date of Patent: Oct. 18, 2022

(54) OPTICAL ELEMENT AND METHOD OF MAKING AN OPTICAL ELEMENT

(71) Applicant: Carl Zeiss Meditec AG, Jena (DE)

(72) Inventors: Christian Beder, Aalen (DE); Christoph Zaczek, Heubach (DE); Erwin Gaber, Heidenheim (DE); Diana Tonova, Aalen (DE); Michael Sundermann, Aalen (DE)

(73) Assignee: Carl Zeiss Meditec AG, Jena (DE)

( * ) Notice: Subject to any disclaimer, the term of this patent is extended or adjusted under 35 U.S.C. 154(b) by 248 days.

(21) Appl. No.: 16/878,321

(22) Filed: May 19, 2020

(65) Prior Publication Data
US 2020/0278480 A1    Sep. 3, 2020

Related U.S. Application Data

(62) Division of application No. 15/614,122, filed on Jun. 5, 2017, now Pat. No. 10,698,135.

(30) Foreign Application Priority Data

Jun. 3, 2016 (DE) ..................... 10 2016 110 351.9

(51) Int. Cl.
*G02B 1/11* (2015.01)
*G02B 27/00* (2006.01)
(Continued)

(52) U.S. Cl.
CPC ............ *G02B 1/11* (2013.01); *G02B 27/0012* (2013.01); *G02F 1/0102* (2013.01); *G02F 1/09* (2013.01); *G02B 1/12* (2013.01); *H01Q 15/006* (2013.01)

(58) Field of Classification Search
CPC ........ G02B 1/11; G02B 27/0012; G02B 1/12; G02B 1/115; G02B 1/10; G02B 5/04
See application file for complete search history.

(56) References Cited

U.S. PATENT DOCUMENTS 5,183,689 A   2/1993 Taylor et al.
5,235,444 A   8/1993 de Vaan
(Continued)

FOREIGN PATENT DOCUMENTS

DE   10 2011 079 933 A1   2/2012
JP   2004182530 A          7/2004
(Continued)

OTHER PUBLICATIONS

Office action and English translation of the Office action of the Japanese Patent Office dated Mar. 25, 2021 in corresponding Japanese patent application 2017-109795.
(Continued)

*Primary Examiner* — Kimberly N. Kakalec
(74) *Attorney, Agent, or Firm* — Walter Ottesen, P.A.

(57) ABSTRACT

A method for producing an optical element having a main body with a first side surface, which has a first optical coating, and at least one second side surface, which is not plane-parallel to the first side surface and has a second optical coating, is proposed. The method includes the steps of: determining the stress induced in the optical element by the first optical coating of the first side surface; determining a counter-stress, so that the resultant overall stress induced in the optical element is as small as possible; determining the second optical coating while taking into account the determined counter-stress and the optical parameters of the second optical coating; applying the first optical coating on the first side surface; and, applying the second optical coating on the at least one second side surface.

11 Claims, 4 Drawing Sheets

(51) Int. Cl.
    *G02F 1/01*     (2006.01)
    *G02F 1/09*     (2006.01)
    *G02B 1/12*     (2006.01)
    *H01Q 15/00*     (2006.01)

(56) References Cited

U.S. PATENT DOCUMENTS

| | | | |
|---|---|---|---|
| 6,134,049 | A | 10/2000 | Spiller et al. |
| 7,684,120 | B2 | 3/2010 | Aoki |
| 8,848,167 | B2 | 9/2014 | Lippert et al. |
| 2007/0211339 | A1 | 9/2007 | Furusato |
| 2010/0182710 | A1 | 7/2010 | Dinger et al. |
| 2012/0044473 | A1 | 2/2012 | Lippert et al. |
| 2014/0125947 | A1 | 5/2014 | Imizu et al. |
| 2015/0049334 | A1 | 2/2015 | Lin et al. |

FOREIGN PATENT DOCUMENTS

| | | | |
|---|---|---|---|
| JP | 2005221987 | A | 8/2005 |
| JP | 2006049910 | A | 2/2006 |
| JP | 5127018 | B2 | 4/2006 |
| JP | 2006-301585 | A | 11/2006 |
| JP | 2010-528480 | A | 8/2010 |
| JP | 2012069925 | A | 4/2012 |
| WO | 2012/165579 | A1 | 2/2015 |

OTHER PUBLICATIONS

Ennos, A.E., "Stresses Developed in Optical Film Coatings", Applied Optics, vol. 5, No. 1, Jan. 1966, pp. 51 to 61.
Johnson, R. B., "What's different about ultraviolet and infrared optics?," Proc. SPIE 10265, Optomechanical Design: A Critical Review, 1026504 (Dec. 28, 1992); doi: 10.1117/12.61101 Event: San Diego '92, 1992, San Diego, CA, United States, pp. 61 to 75.
Mirkarimi, P.B., "Stress, reflectance, and temporal stability of sputter-deposited Mo/Si and Mo/Be multilayer films for extreme ultraviolet lithograpy", Opt. Eng. 38(7), Jul. 1999, Society of Photo-Optical Instrumentation Engineers, pp. 1246 to 1259.
M. de Denus-Baillargeon et al, "Design and fabrication of stress-compensated optical coatings: Fabry-Perot filters for astronomical applications", Applied Optics, vol. 53, No. 12, Apr. 20, 2014, pp. 2616 to 2624.
Office action and English translation of the Office action of the German Patent Office dated Jan. 20, 2017 in German patent application 10 2016 110 351.9 on which the claim of priority is based.
Office action and English translation of the Office action of the Chinese Patent Office dated Apr. 23, 2020 in corresponding Chinese patent application 2017 10 408 133.6.
Shao et al, A finite element simulation analysis method of low-frequency profile parameters of large-diameter coating elements, issued Dec. 31, 2015, abstract in English downloaded from https://kreader.cnki.net/Kreader/CatalogViewPage.aspxdbCode=CPFD&filename=SHJG201512001091&tablename=CPFDLAST2016&compose=&first=1&uid=WEEvREcwSlJHSldTTEYzWEpEZktmaWY5Z3dqN2paN0JDT0VVT2pOVlp0bz0=$9A4hF_YAuvQ5obgVAqNKPCYcEjKensW4IQMovwHtwkF4VYPoHbKxJw! !.

OPTICAL ELEMENT AND METHOD OF MAKING AN OPTICAL ELEMENT

CROSS REFERENCE TO RELATED APPLICATIONS

This application is a divisional application of application Ser. No. 15/614,122, filed Jun. 5, 2017 (published as US2017/0351007 A1), which, in turn, claims priority of German patent application no. 10 2016 110 351.9, filed Jun. 3, 2016; the entire content of both applications is incorporated herein by reference.

FIELD OF THE INVENTION

The present disclosure relates to a method for producing an optical element having a main body with a first side surface, which has a first optical coating, and at least one second side surface, which is not plane-parallel to the first side surface and has a second optical coating. It also relates to an optical element produced by this method.

BACKGROUND OF THE INVENTION

It is known in the case of optical elements that have an optical coating on their main body that the optical coating can cause compressive or tensile stresses. The thicker the optical coating, and in particular the greater the number of layers of the optical coating, the greater the stress that is caused. These stresses lead to deformations of the main body, which can for example be manifested as wavefront deformations.

In the case of optical elements of a cuboidal construction, such as for instance Fabry-Perot interferometers, it is known for example from the article by Marie-Maude de Denus-Baillargeon et al., Applied Optics, volume 53, No. 12, pages 2616ff. either to optimize the optical coating itself to the extent that the stress exerted by it is as small as possible or in the simplest case to apply an identical coating to the side opposite from the coated side, so that the stresses cancel one another out. Among the ways in which the authors seek to find suitable coatings is to resort to methods of calculation of the finite element method.

It is known from U.S. Pat. No. 8,848,167 in the case of optical elements for UV or EUV lithography that have a functional coating on a first side of a substrate likewise to provide on a second side that has a common edge with the first side a coating of a thickness and stress chosen such that the quotient of the product of the thickness and stress of the functional coating divided by the thickness and stress of the coating of the second side lies in a range of values between 0.8 and 5.0. In particular, all sides that share a common edge with the first edge are coated for stress compensation.

SUMMARY OF THE INVENTION

It is an object of the present invention to provide a method for producing optical elements in which the deformations of the main body that are caused by an optical coating are reduced.

This object can, for example, be achieved by a method for producing an optical element having a main body with a first side surface, which has a first optical coating, and at least one second side surface, which is not plane-parallel to the first side surface and has a second optical coating, including the steps of:

determining the stress induced in the optical element by the first optical coating of the first side surface;
determining a counter-stress, so that the resultant overall stress induced in the optical element is as small as possible;
determining the second optical coating while taking into account the determined counter-stress and optical parameters of this second optical coating;
applying the first optical coating on the first side surface;
applying the second optical coating on the at least one second side surface.

In the case of optical elements that have at least two side surfaces which are not plane-parallel to one another, as may be the case for example with optical elements of which the main body is formed as a prism or substantially as wedge-shaped plates, or any polyhedra in which at least one edge angle is not equal to 90°, there is the problem that the approaches known from the prior art, for instance of applying an identical coating on an opposite side surface or of providing adjoining side surfaces with any coatings as long as sufficient stress compensation is thereby achieved, cannot be readily used. The problem is exacerbated if one or more of the side surfaces of the optical element are curved.

It should be pointed out that the stress induced by the first optical coating of the first side surface and the counter-stress are mechanical stresses, in particular compressive and/or tensile stresses.

It has been found that the complexity of the production even of such optical elements with a more complicated geometry becomes more manageable, with the least possible deformations, if the problem of the choice of suitable optical coatings is divided into a number of sub-problems that are successively solved. According to the procedure proposed here, first one side surface with its optical coating is selected as it were as the main side surface or as the main coating. The side surface of which the optical coating will presumably induce the greatest stresses, for example because of its thickness or high number of individual layers, is preferably chosen for this. On the basis of this first optical coating, it is ascertained more precisely which stress is actually to be expected or occurs. One of the ways in which this can be ascertained is by simulation calculations or measurements on corresponding prototypes of the optical element. On the basis of these results, it can be calculated which counter-stress would be necessary to counteract as well as possible the stress caused by the first optical coating. The counter-stress thus ascertained serves along with the optical parameters as a boundary condition for selecting a second optical coating before first the first optical coating and then the second optical coating are applied to the respective side surfaces. Already when calculating the counter-stress, it may be advantageously taken into account over which edge region and at what angle the first and second side surfaces adjoin one another. If the choice of materials for the second optical coating is restricted on account of the optical parameters, the mechanical properties of the materials coming into consideration are preferably taken into account when determining the second optical coating. It may be advantageous overall to take non-optical parameters, such as for example a minimum mechanical stability or the like, into account when determining the second coating.

It is preferably taken into account when determining the counter-stress that the RMS value of the first side surface and/or of the second side surface with the respective coating is limited to a maximum of 10% of the main wavelength, or its Strehl ratio or their Strehl ratios is or are at least 0.8. Taking one or both parameters into account allows the aim of a sufficiently small deformation of the main body at the corresponding side surface to be achieved for many optical applications. The RMS value is the mean square deviation of the actual surface profile from the ideal surface profile. The mean wavelength of the wavelength range occurring during the operation of the optical element may be chosen as the main wavelength. If it is known that there is a certain intensity distribution within the wavelength range, instead of the arithmetic mean value the correspondingly weighted arithmetic mean value may be used for example as a basis. The Strehl ratio is ascertained by setting the intensity of the Airy disc of an optical element in relation to the intensity of the Airy disc of the corresponding ideal optical element. The theoretically best possible quality is in this case set to 1.

Methods of calculation of the finite element method are advantageously used for determining the counter-stress and/or the stress induced by the first optical coating of the first side surface in the optical element and/or determining the second optical coating. The finite element method is a method that has in the meantime been tried and tested many times for ascertaining mechanical properties, even of more complex articles.

Preferably, after applying the first optical coating on the first side surface and the second optical coating on the at least one second side surface, the overall stress actually induced in the optical element is ascertained experimentally, compared with the desired overall stress and, in the case of an excessive deviation, the first optical coating and/or second optical coating and/or a further side surface of the optical element is/are locally worked. In this way, deformation effects that have possibly not been taken into account in the calculation of the counter-stress produced by the first optical coating and/or second optical coating, such as for example production tolerances, can be corrected. In the local reworking, it is advantageously ensured in the case of optical coatings that possible changes in material thickness do not cause unwanted changes in the optical properties of the optical coating. Particularly preferably, the local working is carried out via magnetorheological polishing or ion-beam polishing. With the aid of these methods, material can be removed locally from the coating surface particularly accurately and with good control, even over small areas in the micrometer range.

In preferred embodiments, the main body of the optical element is also modified. In particular in edge regions in which it may be difficult to compensate for the stress caused by the first optical coating by second optical coatings because of a small angle between the two side surfaces possibly adjoining one another and the correspondingly small amount of main body material, it may be helpful for reducing the deformation of one or both side surfaces to provide additional main body material there.

The optical coatings may be applied to the main body by all previously customary physical and/or chemical methods for deposition from the vapor phase. With a view to good reproducibility of the thicknesses of the individual layers of the optical coating, they are preferably applied via sputtering methods. Ion- or plasma-assisted methods of physical deposition from the vapor phase are also well suited. Ion- or plasma-assisted sputtering methods may be relied upon in particular.

The object can, for example, also be achieved by an optical element that has been produced by a method proposed here.

In preferred embodiments, the at least one second side surface adjoins the first side surface.

In particularly preferred embodiments, its main body or a subunit of the main body is formed as a prism or a wedge-shaped plate. A prism should be understood in this connection as meaning a geometrical prism. In the case of the wedge-shaped plate, the portion of a wedge that corresponds to the tapering edge region may be missing.

The optical element preferably has a first or second optical coating, which is formed as an antireflection coating, as a reflection coating or as a filter layer. The filter layer may be in particular a fluorescence filter, a polarization filter, a notch filter, a bandpass filter, a shortpass filter or a longpass filter.

The optical element is preferably configured for use in the infrared and/or visible wavelength range. Optical coatings for these wavelength ranges could be significantly thicker than for example for the ultraviolet or extreme ultraviolet wavelength range, and as a result cause much greater stresses and deformations of the main body of the optical element or of the optically used side surface(s). Consequently, production according to the proposed method is particularly advantageous.

Altogether, depending on the configuration, the optical element may be used inter alia as a polarizer, an optical prism, a beam splitter, a beam combiner or a mirror.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
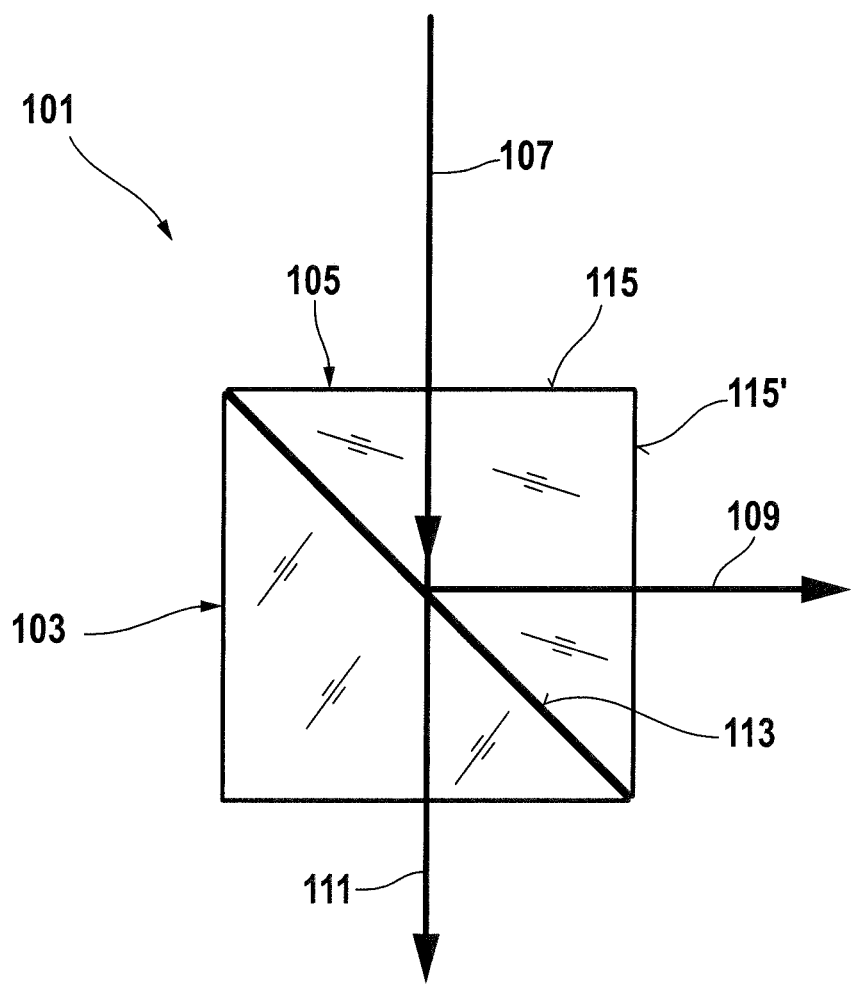
FIG. 1 schematically shows a first beam splitter in side view.

In FIG. 1, a first beam splitter 101 is schematically represented in side view. It is made up of a first prism 105 and a second prism 103, which have an equilateral triangle as the base area. The second prism 103 has no optical coatings. The first prism 105 has on its side surface 113 an optical coating that serves as a beam splitter layer and under an incident beam 107 transmits light in the visible wavelength range, so that it passes through the prism 103 as a partial beam 111, and reflects light in the infrared wavelength range, so that it is decoupled as a partial beam 109 and leaves the prism 105. Furthermore, the side surfaces 115 and 115' adjoining the side surface 113 have an optical coating that serves as an antireflection coating, in order that as little intensity as possible is lost when the beam 107 enters through the side surface 115 and the partial beam 109 leaves through the side surface 115'.

Since the beam splitter layer is thicker by a multiple than a customary antireflection layer, and it can consequently be expected that a greater stress is exerted on the first prism 105 by the beam splitter layer than by the antireflection layers, first the stress that the beam splitter layer exerts on the first prism 105 was ascertained, and which counter-stress is necessary to compensate for this in such a way that a Strehl ratio of 0.79 is maintained both at the side surface 113 and at the side surfaces 115, 115'. The side surface 113 was consequently treated as the first side surface. Taking into account the counter-stress thus ascertained and the optical limiting values to be maintained for a low reflection in the visible to infrared wavelength range, the layer design of the antireflection layers for the side surfaces 115, 115' was ascertained. The side surfaces 115, 115' were consequently treated as two second side surfaces. In the example represented here it was possible to combine a conventional antireflection coating with an additional, optically neutral silicon dioxide layer. The beam splitter layer, defined from the outset, was applied to the side surface 113 of the first prism 105 and subsequently the antireflection coatings supplemented with the silicon dioxide layer were applied to the adjoining side surfaces 115, 115'.

Figure 2:
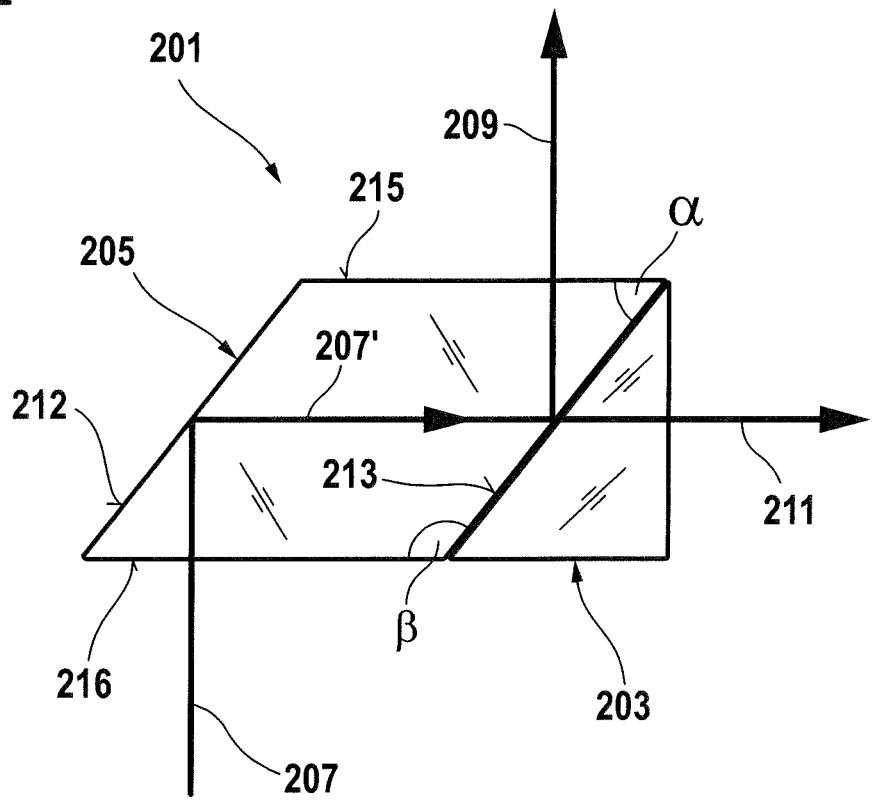
FIG. 2 schematically shows a second beam splitter in side view.

In FIG. 2, a second beam splitter 201 with a first prism 205 and a second prism 203 is schematically represented in side view. As a difference from the beam splitter represented in FIG. 1, in the case of the beam splitter 201 the first prism that is optically relevant for the splitting of the beam is formed as a rhombic prism 205. This has the effect that the side surfaces 215, 216 that adjoin the side surface 213 with the beam splitter layer form different angles with the side surface 213. The side surface 215 forms an angle α of less than 90° with a side surface 213, while the side surface 216 forms an angle β of greater than 90° with the side surface 213.

In the beam splitter 201 described here, a light beam 207 incident through the side surface 216 is first reflected at the side surface 212 to form an incident light beam 207', which is divided at the side surface 213 by the beam splitter layer located there into a transmitted partial beam 211 with wavelengths in the visible wavelength range and a reflected partial beam 209 with wavelengths in the infrared wavelength range, which leaves through the side surface 215, which is therefore intended to have an antireflection layer.

Figure 4A:
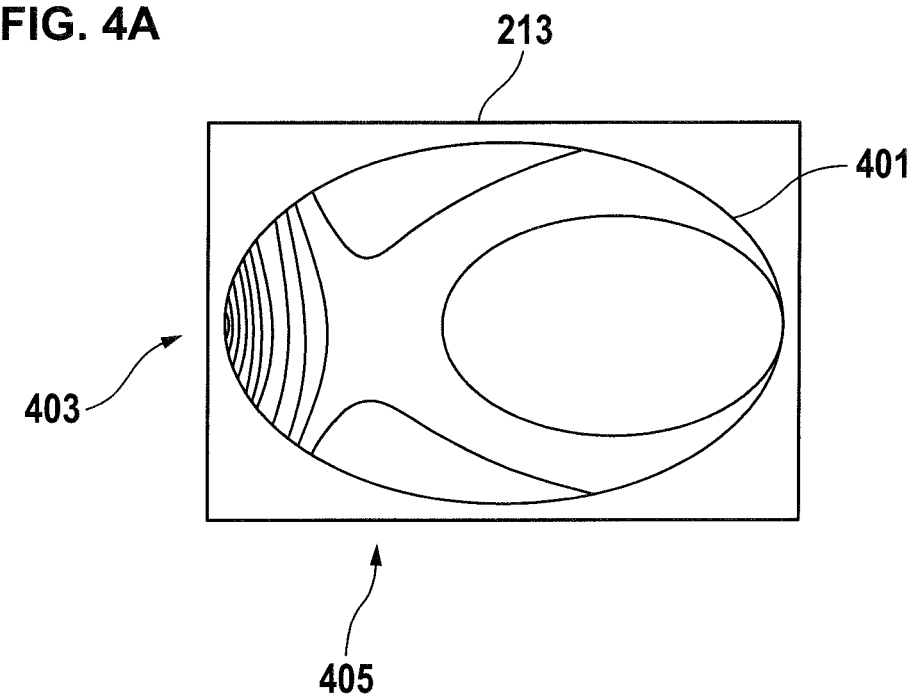
FIG. 4A shows the deformation of a first side surface of a rhombic prism of the second beam splitter with a first optical coating.

In the example shown in FIG. 2, the beam splitter layer includes alternately arranged layers of niobium oxide and aluminium oxide, the individual layer thicknesses of which vary between 10 nm and 200 nm and add up to an overall layer thickness of about 11 000 nm. This beam splitter layer has for wavelengths between 400 nm to 700 nm a transmission rate of greater than 99% at angles of incidence of 45°±3° and for wavelengths between 800 nm and 900 nm a reflection rate of greater than 98%, likewise at angles of incidence of 45°±3°. Since conventional antireflection layers that are suitable for the side surface 215 have overall layer thicknesses of just under 1000 nm, the beam splitter layer was taken as a basis as the first optical coating and the side surface 213 was taken as a basis as the first side surface and the stress caused by the beam splitter layer was calculated with the aid of FEM (finite element method) methods of calculation. This stress is a compressive stress of about 2500 GPa, which in the case of a substrate of quartz glass is distributed very unevenly over the area of the side surface 213. The side surface 213 has dimensions of about 1.6 cm×2.4 cm. The deformations of the side surface 213 induced as a result are represented in FIG. 4A as a contour line drawing, to be precise for the area 401 illuminated by the incident beam on the side surface 213. The depicted contour lines correspond to differences in height of 40 nm in each case, with the exception of the elliptical contour line, which corresponds to a height difference of 30 nm. In this case, the two L-shaped contour lines depicted in the region 405 are the 0 nm lines. In the region 403, where the side surface 213 has a common edge with the side surface 215 and particularly little substrate material is present, the surface profile deviates by up to 400 nm from the ideal surface.

For this stress distribution, a suitable counter-stress was determined when coating the side surface 215, with the proviso of an RMS value of the side surface 213 of a maximum of 9% of the central wavelength of 650 nm. In order to achieve better stress compensation, a coating with an optically neutral material, here silicon dioxide, on the side surface 216 was additionally included in the FEM calculations. The side surface 213 was consequently treated as the first side surface and the side surfaces 215, 216 were treated as different second side surfaces.

The result was included in the layer design of the antireflection layer for the side surface 215. Alternately arranged layers of niobium oxide and silicon dioxide, the individual layer thicknesses of which vary between 10 nm and 150 nm and add up to an overall thickness of about 7 micrometers, were chosen. Furthermore, the thickness of several 100 nm of the compensation layer of silicon dioxide on the side surface 216 was determined, a thickness profile from a maximum at the edge of the side surface 213 to a minimum at the opposite edge having been chosen. In variants, it is also possible to work with a constant thickness or else for one of the optical coatings to have a thickness profile.

Figure 3:
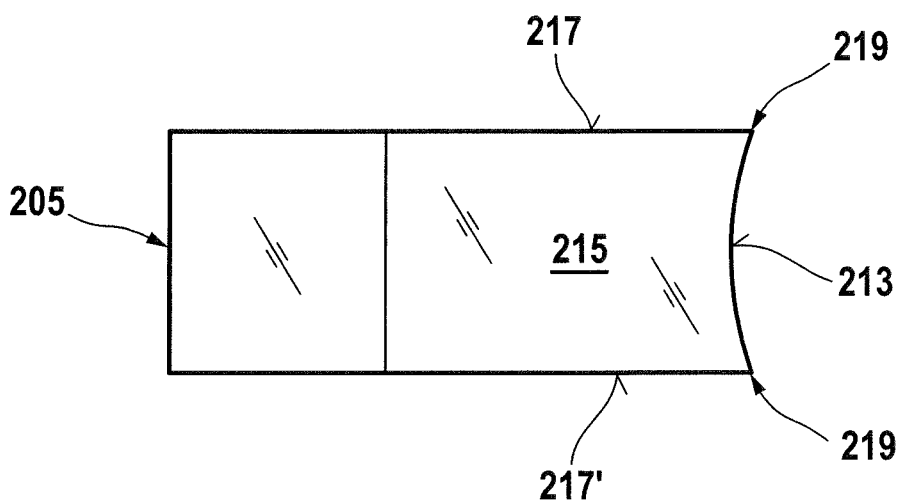
FIG. 3 schematically shows the second beam splitter in plan view.

However, it also had to be noted that the side surfaces 217, 217' that are perpendicular to the side surfaces 215, 216 and are represented in FIG. 3, a schematic plan view of the rhombic prism 205, cannot be coated for production-related reasons. In order nevertheless to be able to maintain the required RMS value, the substrate was modified at the side surface 213 in such a way that a supply of material 219 is respectively provided at the two edges of the side surfaces 217, 217'. This measure made it possible to have a positive influence on the saddle-shaped deformation in the region 405 of the illuminated area 401 in FIG. 4A.

Figure 4B:
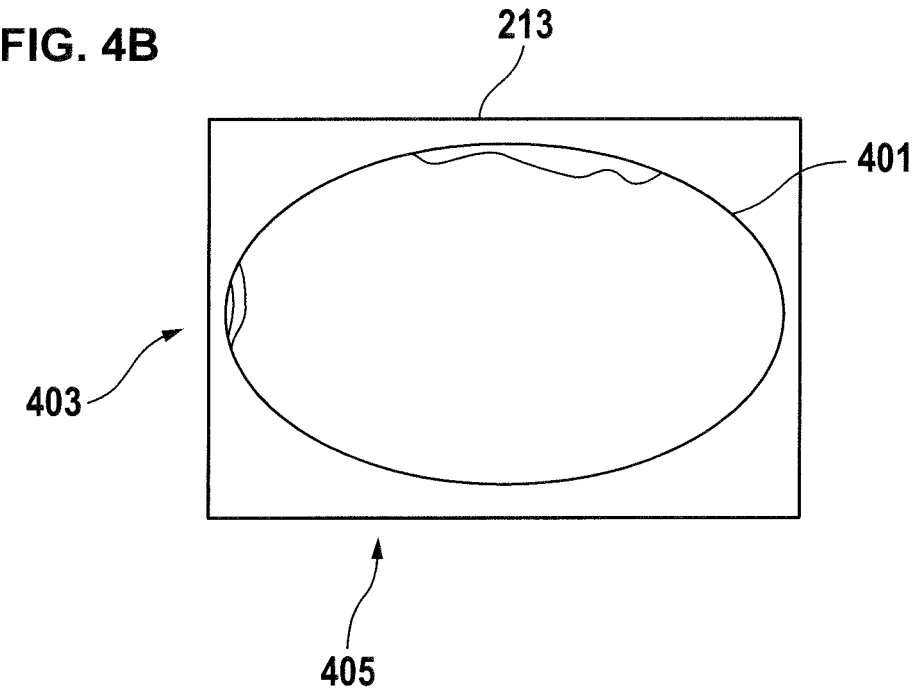
FIG. 4B shows the deformation of the first side surface of the rhombic prism of the second beam splitter with additionally a second optical coating on an adjoining second side surface.

After applying the beam splitter layer to the side surface 213 of the modified prism substrate by magnetron sputtering, and subsequently the antireflection layer to the side surface 215 and the compensation layer to the side surface 216, likewise by magnetron sputtering, the deformation of the side surface 215 in the region of the beam spot 401 was measured interferometrically. The result is represented in FIG. 4B. As in FIG. 4A, the contour lines respectively correspond to a difference in height of 40 nm. Only in the outermost peripheral region of the beam spot 401 in the region 403 is a difference in height of over 100 nm reached. The RMS value over the area of the beam spot 401 is at about 8.5% of the central wavelength.

Figure 5:
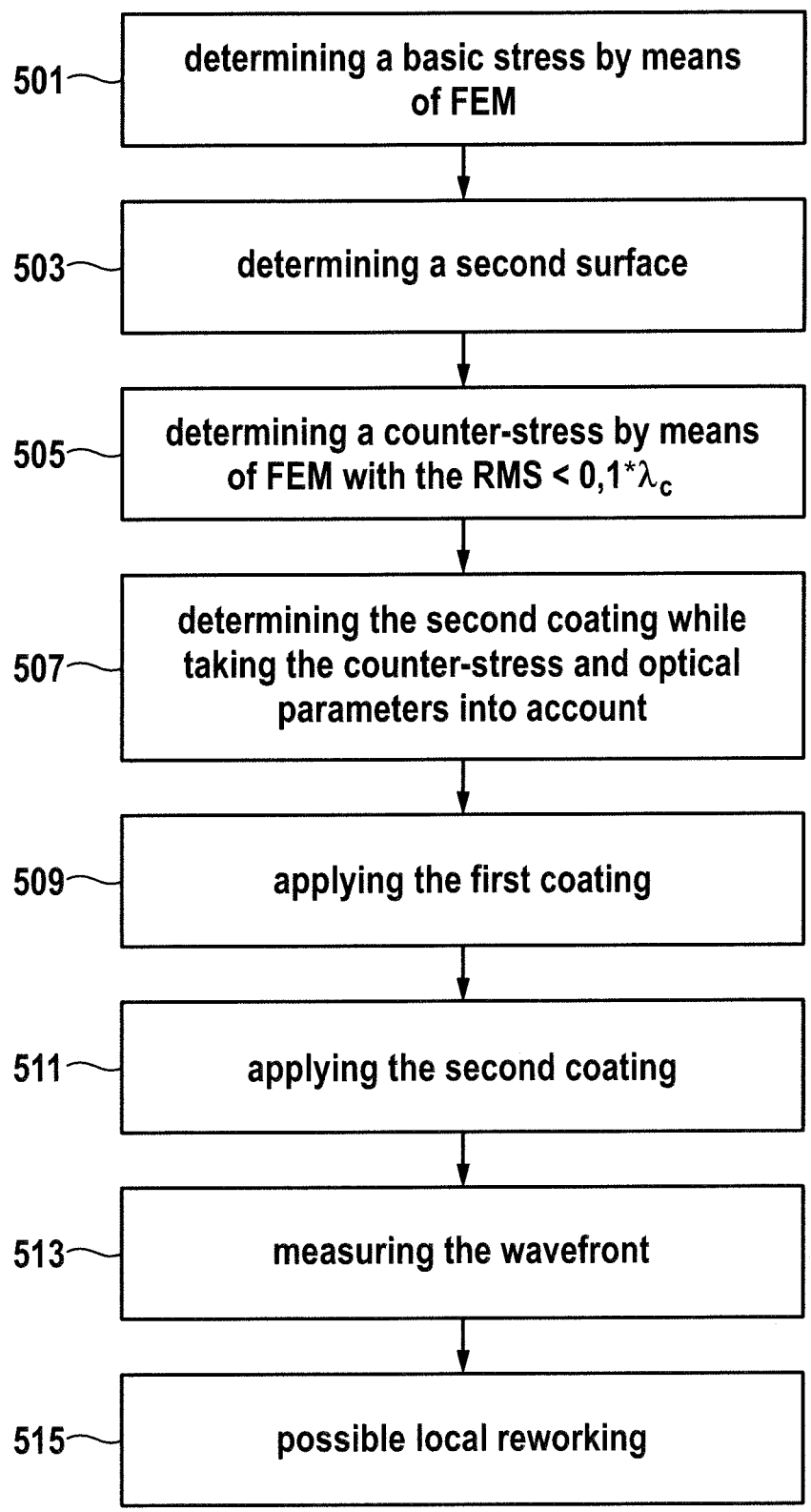
FIG. 5 shows the sequence of an embodiment of the proposed production method.

An embodiment of the method proposed here for producing an optical element having a main body with a first side surface, which has a first optical coating, and at least one adjoining second side surface, which has a second optical coating, will be explained on the basis of FIG. 5.

In a first method step 501 "determining a basic stress by means of FEM", the basic stress that is caused by the first optical coating on the first side surface is calculated via FEM. It is alternatively possible to produce a test element having the main body of the planned optical element and only the first optical coating on the first side surface and to determine experimentally the deformation of the first side surface that is induced by the stress applied by the first optical coating. Furthermore, in step 503 "determining a second surface", it is established which is/are the second side surface(s) to be provided with a second optical coating that at least partially compensates for the stress caused by the first optical coating. If the number of second side surfaces is restricted for production-related reasons, preferably one or more side surfaces adjoining the first side surface that form an angle of less than 90° with the first side surface is/are chosen.

Using the basic stress ascertained and taking the position of the second side surface(s) into account, in the present example it is calculated via FEM with which counter-stress an RMS value of less than 10% of the central wavelength can be maintained for all of the side surfaces to be provided with optical coatings and also any further optically used side surfaces (step 505 "determining a counter-stress by means of FEM with the RMS<$0.1*\lambda_c$.

On the basis of these items of information and taking the optical parameters to be maintained into account, the configuration of the second optical coating is chosen (step 507 "determining the second coating while taking the counter-stress and optical parameters into account") and first the first optical coating and then the second optical coating are applied to the respective side surfaces of the optical element, preferably by sputtering methods (step 509 "applying the first coating", step 511 "applying the second coating").

After the coating of the main body, in step 513 "measuring the wavefront" the actual overall stress induced in the optical element is ascertained experimentally, in that in the present example the wavefront of the light rays that pass through the optically used side surfaces or are reflected is measured. From this, the overall stress actually existing over the respective surfaces is deduced and compared with the desired overall stress. In the case of an excessive deviation, the optical coatings or possibly the surface of an optically used, but uncoated side surface are locally reworked where necessary, in particular via magnetorheological polishing or ion-beam polishing (step 515 "possible local reworking"). These two steps are especially helpful in the case of more complex geometries of the optical element to be produced, such as for instance curved surface profiles. Not always can all of the interactions that may lead to certain stress profiles on the basis of optical coatings be taken into account at all or with sufficient accuracy in simulation calculations, so that retesting and correction may lead to better results in the case of high-precision optical elements.

It should be pointed out that, although the invention has been explained on the basis of optical elements in the case of which the first side surface and the at least one second side surface adjoin one another, the examples can be readily transferred to any optical elements in the case of which the first side surface and the at least one second side surface are not plane-parallel to one another. Furthermore, they can be transferred to any desired applications, such as for instance polarizers, fluorescence filters, beam combiners, et cetera, Depending on the specific form of the optical element, in the case of a number of second coatings one or more may also be without any optical function.

It is understood that the foregoing description is that of the preferred embodiments of the invention and that various changes and modifications may be made thereto without departing from the spirit and scope of the invention as defined in the appended claims.

REFERENCE SIGNS

101 Beam splitter
103 Second prism
105 First prism
107 Incident beam
109 Reflected partial beam
111 Transmitted partial beam
113 Side surface
115, 115' Side surfaces
201 Beam splitter
203 Second prism
205 Rhombic prism
207, 207' Incident beam
209 Reflected partial beam
211 Transmitted partial beam
212 Side surface
213 Side surface
215 Side surface
216 Side surface
217, 217' Side surface
219 Supply
401 Beam spot
403 Region
405 Region
501-515 Method steps
$\alpha, \beta$ Angles

What is claimed is:

1. A method for making an optical element having a main body with a first side surface, which has a first optical coating, and at least one second side surface, which is not plane-parallel to the first side surface and has a second optical coating, the method comprising the steps of:
   determining the stress induced in the optical element by the first optical coating of the first side surface;
   determining a counter-stress, so that the resultant overall stress induced in the optical element is as small as possible;
   determining the second optical coating while taking into account the determined counter-stress and the optical parameters of the second optical coating;
   applying the first optical coating on the first side surface; and,
   applying the second optical coating on the at least one second side surface.

2. The method of claim 1, wherein the second optical coating is determined under the condition that the RMS value of at least one of the first side surface and the second side surface with the respective coating is limited to a maximum of 10% of at least one of the main wavelength and its Strehl ratio or their Strehl ratios is or are at least 0.8.

3. The method of claim 1, wherein methods of calculation of the finite element method are used for at least one of determining the counter-stress, determining the stress induced by the optical coating of the first side surface in the optical element and determining the second coating.

4. The method of claim 1, further comprising the steps of:
   experimentally ascertaining an overall stress actually induced in the optical element after applying the first optical coating on the first side surface and the second optical coating on the at least one second side surface;
   comparing the overall stress actually induced to a desired overall stress; and,
   locally working at least one of the first optical coating, the second optical coating, and a further side surface of the optical element in the case of a deviation between the overall stress actually induced and the desired overall stress.

5. The method of claim 4, wherein the local working is carried out via magnetorheological polishing or ion-beam polishing.

6. The method of claim 4, wherein said locally working at least one of the first optical coating, the second optical coating, and a further side surface of the optical element is performed in case of the deviation being above a threshold.

7. The method of claim 1 further comprising the step of modifying the main body of the optical element.

8. The method of claim 1, wherein the optical coatings are applied by ion- or plasma-assisted physical deposition from the vapor phase or by sputtering.

9. The method of claim 1, wherein the optical element is configured for operation in at least one of an infrared wavelength range and a visible wavelength range.

10. The method of claim 1, wherein said determining the stress induced in the optical element by the first optical coating of the first side surface is achieved by measuring the stress on a prototype of the optical element.

11. The method of claim 1, wherein said determining the stress induced in the optical element by the first optical coating of the first side surface is achieved by simulation calculations.

* * * * *